United States Patent [19]
Krueger

[11] Patent Number: 5,241,783
[45] Date of Patent: Sep. 7, 1993

[54] APPARATUS AND PROCESS FOR GROWING PLANTS

[76] Inventor: Scott D. Krueger, 1109 Experiment St., Griffin, Ga. 30223

[21] Appl. No.: 575,171

[22] Filed: Aug. 30, 1990

[51] Int. Cl.⁵ .............................................. A01G 9/02
[52] U.S. Cl. .......................................... 47/66; 47/59; 383/87
[58] Field of Search ................. 383/87; 47/59, 63, 64, 47/66

[56] References Cited

U.S. PATENT DOCUMENTS

| | | | |
|---|---|---|---|
| 2,607,940 | 8/1952 | Miller | 383/87 |
| 2,796,700 | 6/1957 | Katz . | |
| 3,550,662 | 12/1970 | Remke et al. | 150/11 |
| 3,973,567 | 8/1976 | Srinivasan | 383/87 |
| 3,977,452 | 8/1976 | Wright | 383/87 |
| 4,209,945 | 7/1980 | Dent et al. | 9/10 |
| 4,369,599 | 1/1983 | Franclet et al. | 9/2 |
| 4,574,522 | 3/1986 | Reiger et al. | 9/2 |
| 4,629,651 | 12/1986 | Davis | 405/16 |
| 4,650,368 | 3/1987 | Bayer | 405/107 |
| 4,750,292 | 6/1988 | Alstig | 47/78 |
| 4,884,367 | 12/1989 | Lawton | 9/2 |
| 4,888,914 | 12/1989 | Reiger | 9/2 |
| 4,913,293 | 4/1990 | Sanders | 383/87 |
| 5,081,791 | 1/1992 | Baron | 47/66 |

FOREIGN PATENT DOCUMENTS

| | | | |
|---|---|---|---|
| 225967 | 8/1985 | German Democratic Rep. | 383/87 |
| 3168 | 6/1987 | PCT Int'l Appl. | 47/59 |
| 1459193 | 12/1976 | United Kingdom | 47/66 |

OTHER PUBLICATIONS

Advertisement entitled "Growers are Hitting Pay Dirt with the Root Control Bag"—Unknown publication, unknown date.
Advertisement entitled "16 Steps to Remember when Using Root Control Bags"—Unknown publication, unknown date.

Primary Examiner—Henry E. Raduazo
Attorney, Agent, or Firm—Hopkins & Thomas

[57] ABSTRACT

A growing medium container or bag for growing plants such as nursery stock above ground, and the process for growing plants in the bags and later transplanting the plants. The design of the containers allow for efficient growing and maintaining of the plants above ground while obviating many of the disadvantages of growing plants, even in containers, in the soil. The process for forming the growing medium container is also disclosed.

14 Claims, 4 Drawing Sheets

APPARATUS AND PROCESS FOR GROWING PLANTS

BACKGROUND OF THE INVENTION

1. Field of the Invention

This invention relates to a growing medium container designed to permit plants such as nursery stock to be grown in their early developmental stages above ground, and to permit vegetable and fruit crops to be grown over their entire life-cycle duration. The invention also relates to the process of forming the container, as well as the process for growing the plants for a limited time above ground and later transplanting the plants into the soil.

2. Description Of The Prior Art

The growing of nursery stock, such as trees, shrubs and other vegetation, especially outdoor plants, in containers during their early stages of development is widely known. Early transplanting bags designed essentially to contain the "earth balls" surrounding the roots of nursery stock for transplanting purposes are disclosed in, for example, U.S. Pat. No. 2,796,700 to Katz, and U.S. Pat. No. 3,550,662 to Remke, et al. These transplanting bags are generally designed to not only contain the earth balls after the plant has been dug from the soil, but also to ensure that the roots system is kept moist and free from damage. Other containers for plant growth and cultivation are disclosed in U.S. Pat. No. 4,209,945 to Dent, et al. and U.S. Pat. No. 4,369,599 to Franclet, et al. The growing of plant stock in-ground and later removing the plant from the ground, bagging the root ball and shipping the plant to be transplanted has many disadvantages. The process is extremely labor intensive. As the plant is removed from the ground, sufficient root structure and earth surrounding the roots must be retained, otherwise the plant may be severely shocked. Further, since the roots are not contained, large roots must be cut which unavoidably causes damage and shocks the plant.

In order to overcome some of these disadvantages of in-ground growing of nursery stock, in-ground growing methods have been developed to contain the developmental growth of the root structure to a specific area. For example, U.S. Pat. No. 4,884,367 to Lawton discloses a root control bag used to contain the roots of plant stock during in-ground cultivation prior to later excavation and transplantation after the plant has reached a desired stage of maturation. Similarly, U.S. Pat. No. 4,574,522 to Reiger, et al. and U.S. Pat. No. 4,888,914 to Reiger disclose a root control bag and a method for root control, respectively, for controlling root growth of nursery stock planted in the ground prior to transplanting. These patents disclose excavating a hole in the ground, lining the hole with a non-woven, porous polymeric fabric bag, inserting a plant with root ball and filling earth around the in-ground planting. When the plant has reached its desired stage of maturation, the plant is then dug out and shipped for transplanting. Even though this method and apparatus alleges to constrict the roots sufficiently to produce nodule root formation and root branching within the container, this method of in-ground cultivation nevertheless has many of the same disadvantages of prior in-ground cultivation techniques. The removal of the plant from an in-ground plot is still labor intensive. Even though it is alleged that not as many roots must be cut because of the use of the non-woven, polymeric bag, the plant still must be dug from the ground requiring much labor and resulting in some root damage. In large in-ground cultivation operations, expensive machinery is usually purchased in order to remove the plantings from the ground.

It is also known in the prior art to grow nursery stock during its early developmental stages above ground in non-porous, plastic side wall containers. The physical properties of these containers dictate not only their size and shape but also the growing medium that can be used. These conventional plastic containers must be shaped to be tall without having a large lower section. This shape is necessitated because of the poor drainage permitted by these containers. This shape causes container handling problems and leads to these containers turning over causing plant damage. Further the poor drainage caused by the containers necessitates that only very open and well drained growing medium can be used. This type of medium causes fertilization and irrigation problems. These tall plastic containers were developed to overcome the problems caused by short, non-porous containers which exagerate the problem of waterlogged soil. The excessive perched water table of capillary water in these prior art containers cannot drain from the container, and the roots quickly die. Further these prior art containers adversely effect heat transfer from the ground to the growing medium, which adversely affects root development.

SUMMARY OF THE INVENTION

The present invention discloses a growing medium container or root containment bag especially designed for above-ground cultivation of plants, including nursery stock, vegetables and fruits, and the methods of making and using the same. The first embodiment of the growing medium container includes a bag preferably made of porous, knitted material defining a side opening therein and adapted to be filled with soil for planting purposes. After the bag is filled with particulate matter such as dirt, field soil or other growing media, the opening is sealed by a closure means incorporated with the root control bag. An opening is then cut in the top panel of the bag to permit the insertion of the plant In another embodiment, the bag is constructed so that the top panel includes two overlaping flaps which define an opening. The opening provides a passageway for the filling of the bag with the particulate material and also for the placement of the plant. Once filled with soil and planted, the growing medium bag is ideally suited for the early developmental growth of nursery stock above ground. The bag is placed on top of a surface capable of capillary water movement, cleared of debris and plants. Water is applied to the top surface of the bag. Water contacting the top surface flows through the material of the bag to the soil and plant roots contained within. Excess water flows out through the bag's bottom surface. Between irrigations, roots within the bag are able to access ground water by the capillary movement of water from the ground up into the growing medium bag. After the plant has grown to a desired size, it can be harvested at any time of the year without any effort other than moving it from its growing location. No weeding, packaging or special care is required. Before planting the plant in its final location, the bag is cut away from the roots.

The growing medium container or bag is also ideally suited for growing vegetable and fruit crops during the entire lifecycle duration of the crops. The bags could therefore be used continuously over multiple growing seasons for the same crops. This would allow crops to be grown above ground in geographical locations having otherwise unsuitable soil for field growing. The process for growing vegetables or fruits in the growing medium bags is the same as that used in growing nursery stock, except that vegetables or fruits would not be later transplanted but would be kept above ground in the bag during their entire growth.

The growing medium container of the present invention and its method of use avoid many of the disadvantages of the prior art growing of nursery stock in-ground. For example, using the present invention there is the opportunity of a year-round harvest, no roots are lost in digging the plant from the ground, plants readily can be moved where and when needed, normally less soil weight is required in shipping, a higher survival of transplanted plants is achieved, weeding or herbicide application is minimized or avoided, less labor and equipment is needed for either planting or harvesting, the method works well in either rocky or sandy soil, less water and fertilizer are normally required, heat transfer from the ground into the growing medium of the bag is promoted because of the broad contact of the bag with the ground, and the soil surface is protected from crusting over by a mulching effect. Many of the above advantages of the present invention are also realized by the present invention over the root control bags used in the in-ground growing methods referenced above. Additional advantages over the in-ground root control bags include that in using the method and apparatus of the present invention, the root system is wider than it is deep as in plants naturally grown in soil, excavation of holes in-ground is avoided, the plant is already packaged and ready to ship, and the soil will not be disturbed during harvesting and shipping.

Accordingly, it is an object of the present invention to provide a growing medium container or bag which is inexpensive to manufacture, durable in structure, and efficient in use.

Another object to the present invention is to provide a growing medium container especially adapted for above-ground growing of nursery stock during its early developmental stages.

Another object to the present invention is to provide a method for growing nursery stock in which the plants are grown entirely above-ground.

Another object to the present invention is to provide a method for making a root control bag from a single sheet of fabric, without requiring the fabric to be cut.

Another object to the present invention is to provide a growing medium bag and a method for growing and transplanting nursery stock which have the advantages over growing plants in-ground in prior root control bags, as discussed above.

Other objects, features and advantages of the present invention will be apparent from the following description when taken in conjunction with the accompanying drawings wherein like characters of reference designate corresponding parts throughout the several views.

DESCRIPTION OF THE PREFERRED EMBODIMENTS

Figure 1:
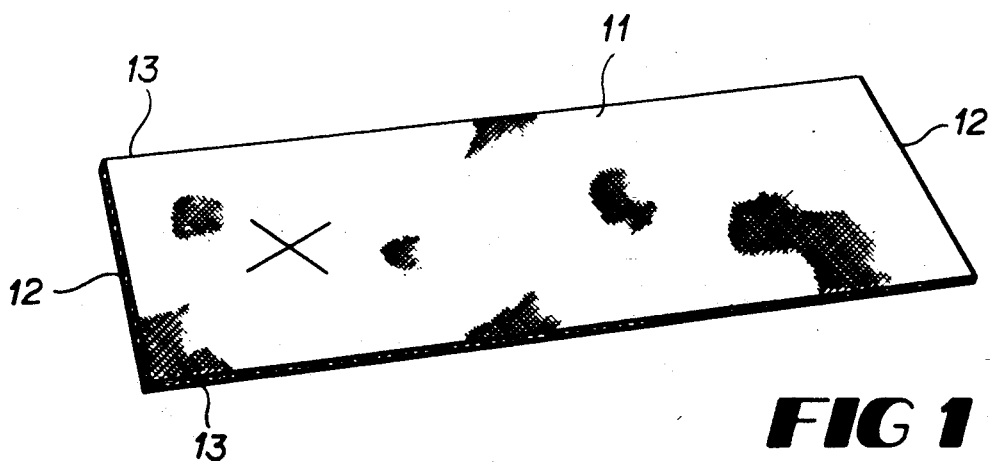
FIG. 1 is a drawing of a rectangular sheet of porous, knitted material used in the construction of the growing medium container of the present invention.

Referring now to the drawings, wherein like reference numerals designate identical, corresponding parts throughout the several views, FIGS. 1-4 depict the growing medium container or bag of the present invention in various stages of its manufacture. In FIG. 1, a single rectangular sheet 11 of flexible material is used to construct the bag 10 of the first embodiment or the bag 110 of the second embodiment. Sheet 11 should be symetrically formed, preferably rectangular or square. FIG. 1 depicts a rectangular sheet having opposed, parallel edges 12 and opposed, parallel edges 13. As described in more detail herein, although sheet 11 can be made of any flexible material, especially that which will not readily deteriorate upon contact with moisture and which is capable of being folded in accordance with the later described method of making the growing medium bag, the material most ideally suited for the present invention is a porous, knitted, ultraviolet stabilized polypropylene fiber material which is readily available. Although a porous, non-woven polymeric material such as DUON ® manufactured by Phillips Fibers Corporation can be used, the knitted material is found to be more suitable. If desired, however, other materials such as canvas or burlap could be used.

Figure 2:
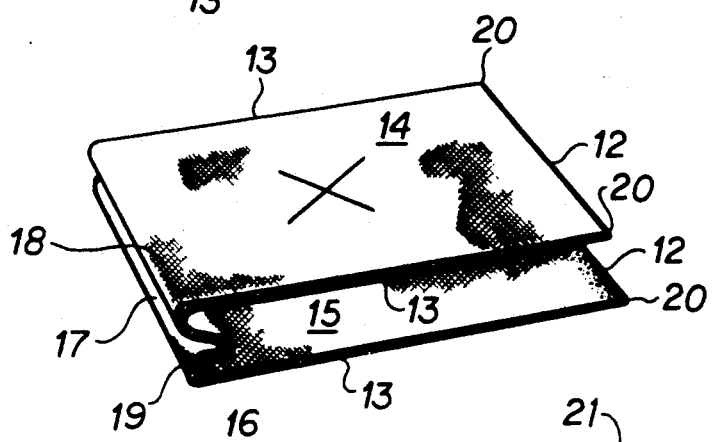
FIG. 2 is a perspective view of the sheet of FIG. 1, folded in accordance with the present invention.
Figure 3:
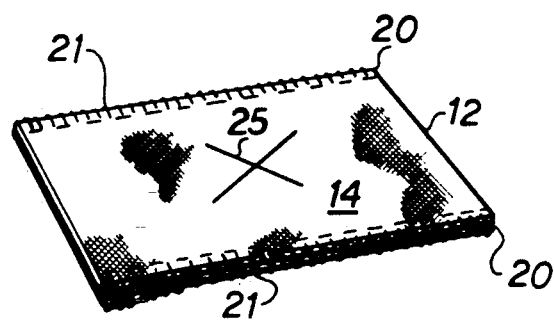
FIG. 3 is a perspective view of a folded sheet of material of the present invention, depicting the stitching.
Figure 4:
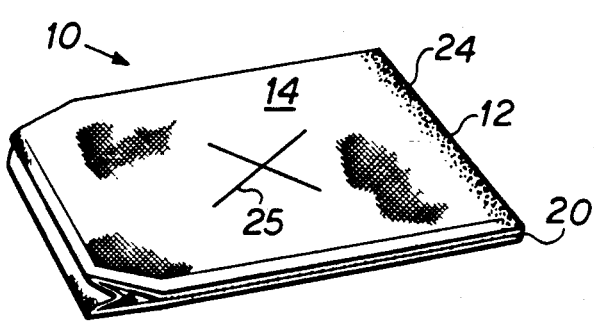
FIG. 4 is a perspective view of the present invention.

In making the growing medium bag 10, edges 12 are folded together as shown in FIGS. 2 and 3 so that one edge 12 is aligned with its corresponding, parallel edge 12. This is done simply by folding the rectangular sheet in half so that a top panel 14 and a bottom panel 15 are thereby created. A fold line 16 will be created opposite adjacent edges 12. Rectangular sheet 11 is then disposed inwardly toward edges 12 at fold 16, as shown in FIG. 2, to form channel-shaped indentation 17 between upper lip 18 and lower lip 19. Sheet 11 is then flattened so that panels 14 and 15 are disposed adjacent one another and upper lip 18 and lower lip 19 are contacting, as shown in FIG. 3. Upper panel 14 and lower panel 15 are then bonded to one another along opposed, parallel edges 13 from lips 18 and 19 to corners 20 of parallel edges 12 by any suitable bonding means, including but not limited to stitching 21. Stitching 21 is ordinarily threaded through upper panel 14 and lower panel 15 to bond edges 13 to one another. In this manner, upper lip 18 and lower lip 19 are also seamed together. The growing medium bag 10 is then formed with a pocket 22 created between panels 14 and 15. The bag 10 is then turned inside-out to form the bag shown in FIG. 4. A closure means is then applied to edges 12 to close the opening 23 created between edges 12. While any suitable closure means is acceptable, a heat sensitive glue 24, which is well known in the art, can comprise one such closure means. If the heat sensitive glue 24 is used, it is applied preferably to the upper sides of both panel 14 and panel 15 along edges 12 as glue 24 shown in FIG. 4. An indicia such as X-shaped indicia 25 is marked on the central portion of upper panel 14 to indicate where the bag 10 can be cut for plant insertion after it is filled with soil.

Figure 7:
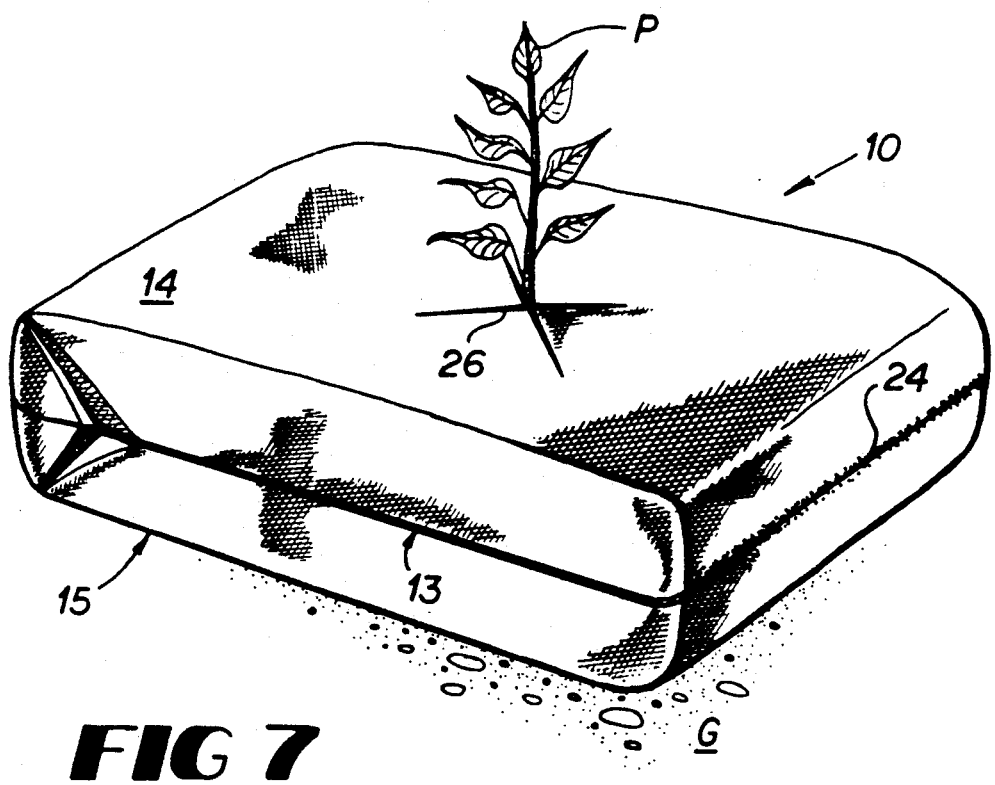
FIG. 7 is a perspective view of the present invention containing soil and a plant.
Figure 6:
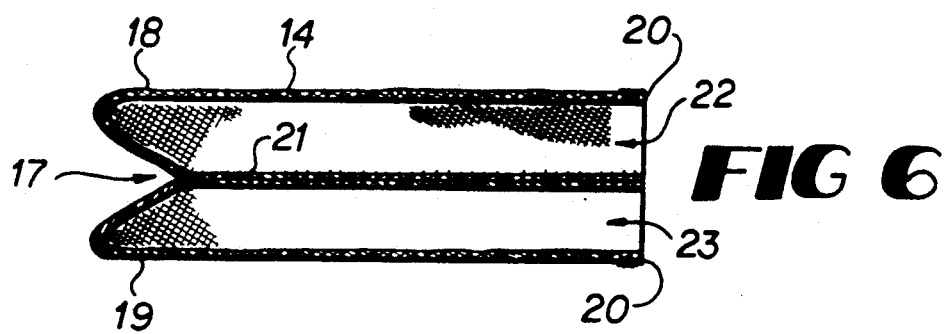
FIG. 6 is a cross-sectional view taken generally along lines 6—6 of FIG. 5.
Figure 5:
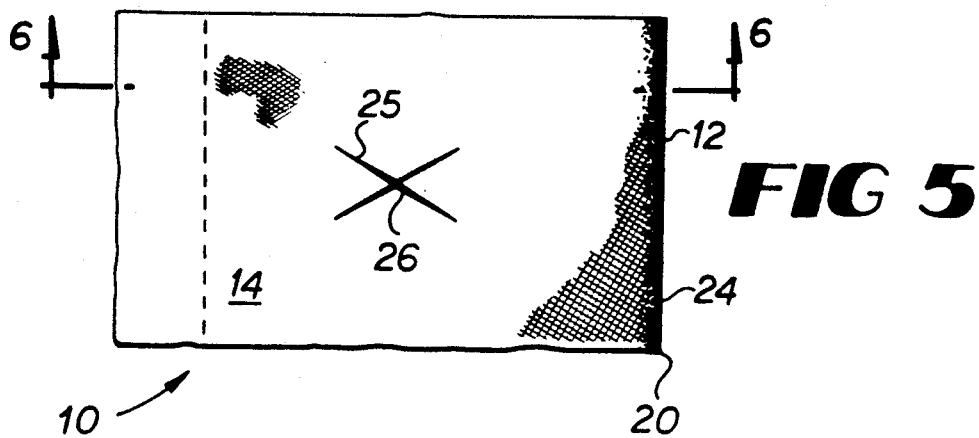
FIG. 5 is a plan view of the present invention.

FIG. 5 shows a plan view of the bag 10 which has been cut along X-shaped indicia 25 to define opening 26 in top panel 14. As shown in cross-section in FIG. 6, when the bag 10 is turned inside-out following the stitching of edges 13, the stitching is disposed within pocket 22. The bag 10 is then ready to be filled with particulate material such as soil or other suitable growing medium. FIG. 7 depicts the bag 10 filled with particulate material and having opening 23 closed by the bonding of adjacent edges 12 with heat sensitive glue 24. A plant P has been inserted into opening 26 cut into top panel 14.

Figure 8:
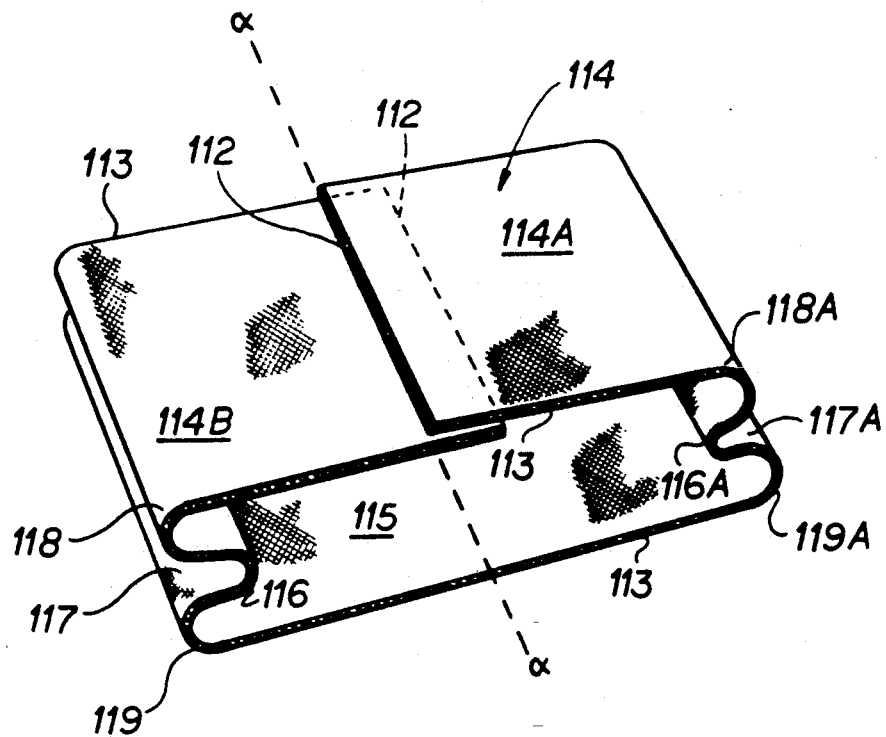
FIG. 8 is a perspective view of another embodiment of the present invention, depicting an alternate folding of a sheet of material.
Figure 9:
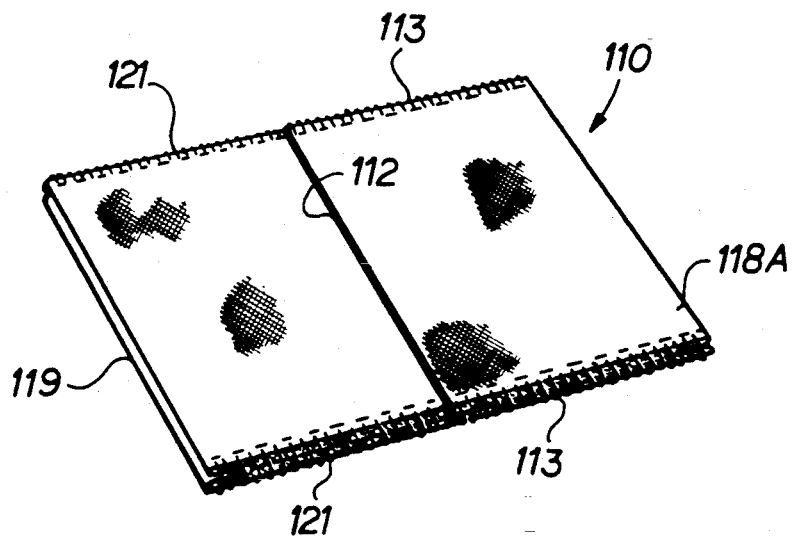
FIG. 9 is a perspective view of the embodiment of FIG. 8, depicting the stitching.
Figure 12:
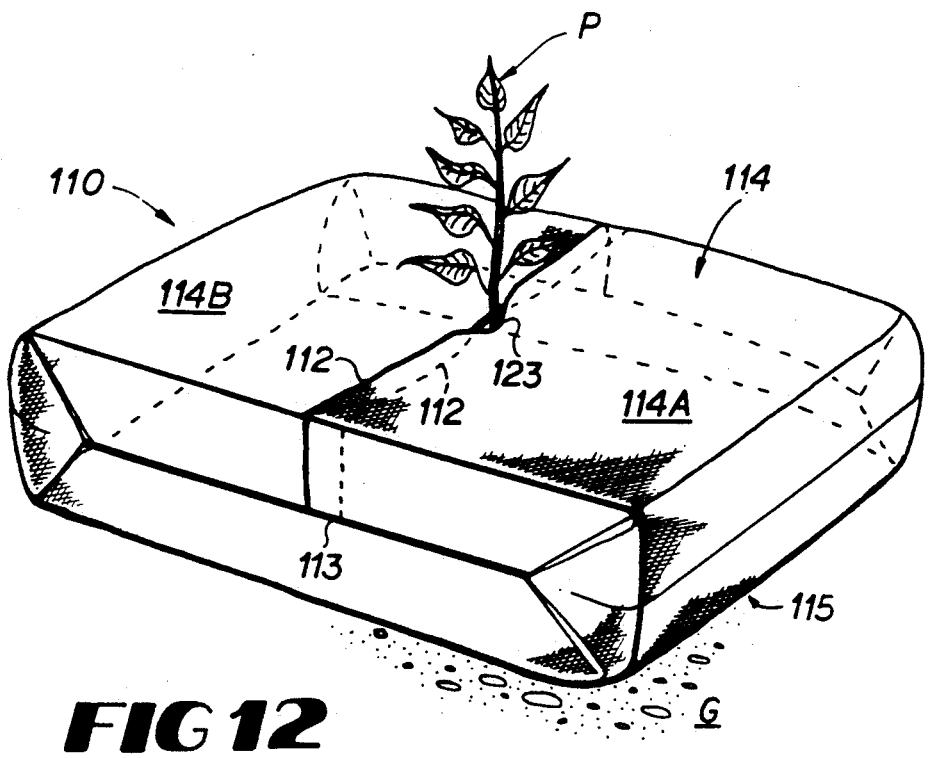
FIG. 12 is a perspective view of the embodiment of FIG. 10 filled with soil and including a plant.

A second embodiment of the present invention, forming growing medium bag 110 is made by folding and sewing rectangular sheet 11 in a different manner from that described above. In the second embodiment, the rectangular sheet 111, identical to rectangular sheet 11, is folded by bringing each opposed parallel edges 112 toward one another so that one edge 112 is disposed approximately along the transverse centerline $\alpha$ of sheet 111 and the opposing edge 112 is disposed below the first described edge 112 and slightly across centerline $\alpha$, as shown in FIG. 8, so that a top panel 114 is created with flaps 114A and 114B disposed on either side of transverse centerline $\alpha$. Also as shown in FIG. 8, there is thereby created an overlaping of flap 114A over flap 114B. Bottom panel 115 is also thereby disposed below top panel 114 so that respective side edges 113 are disposed on either side of panels 114 and 115, respectively. As in the first embodiment, fold 116 is thereby created, but additionally opposing, parallel fold 116A is also created because the ends 112 are brought toward one another. Indentations 117 and 117A are made along folds 116 and 116A to create upper lips 118 and 118A and lower lips 119 and 119A, as shown in FIG. 8. Top panel 114 and bottom panel 115 are then brought together so that respective, corresponding edges 113 are aligned. Respective, adjacent edges 113 are then bonded by, for example, stitching 121 from lips 118 and 119 across edges 113 to and including lips 118A and 119A, as shown in FIG. 9.

Figure 10:
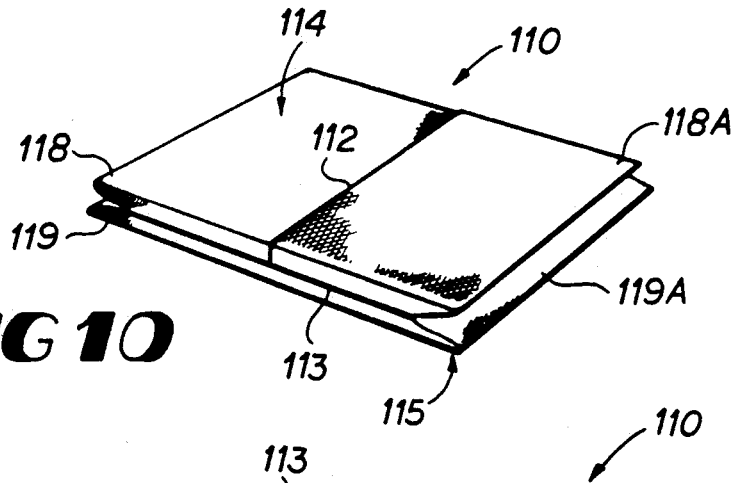
FIG. 10 is a perspective view of the embodiment of FIG. 9, turned inside-out.
Figure 11:
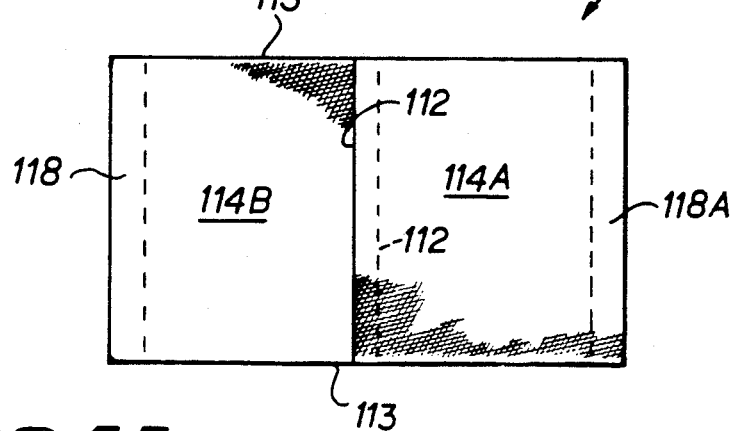
FIG. 11 is a plan view of the embodiment of FIG. 10.

The growing medium bag 110 is then turned inside-out to form the bag 110, as shown in FIG. 10. A pocket (not shown) is thereby created between panels 114 and 115. Opening 123 is also created between respective, overlaping edges 112 of panels 114A and 114B. Since panels 114A and 114B overlap creating opening 123 on the top panel 114, no closure means such as the heat sensitive glue 24 is required to close opening 123. Growing medium bag 110 is then filled with particulate material through opening 123 and a plant P is inserted through opening 123. For shipping empty growing medium or root control bags 10 and 110, the empty bags 10 and 110 are easily collapsed for stacking and placing in shipping containers.

In growing and transplanting nursery stock using bags 10 and 110, the bags are filled with soil and a plant P is placed in openings 26 or 123 in top panels 14 or 114, respectively. The bags 10 or 110 are then placed on top of the ground surface G, which should be clear of debris. The bags 10 or 110 are watered by soaking the top panels 14 or 114 and allowing the water to flow through the soil contained in the bag to contact the roots. Watering of the bags 10 or 110 on the surface can be accomplished either by natural rain water or by sprinkler systems. Additionally, the porous nature of the material 11 or 111 allows the bags to access the ground G capillary water. The plant P is grown above ground in this fashion until it has reached its desired stage of maturation. At this time, the bag 10 or 110 is simply moved and transported to its final location without the necessity of having to be dug from the soil, as in the prior art. When the plant P which has reached the desired maturity is to be transplanted, the bag 10 or 110 is simply cut away from the roots of the plant P before transplanting. When containers 10 or 110 are used for growing plants such as vegetables and fruits, the plants would not be transplanted, but would be grown in the container 10 or 110 during the plant's entire lifecycle.

In growing plants in container 10 or 110, plant root penetration up to several inches is considered advantageous. If root penetration of container 10 or 110 is undesired, however, container 10 or 110 with plant P may be laid over on its side to allow root exposure to sun and air, which will effectively accomplish root pruning.

In addition to the advantages of the present invention over the prior art as discussed above, using the present invention achieves a mulching effect which prevents water evaporation, the broad base of bags 10 and 110 provides self-support, thus avoiding being turned over, no roots must be removed during the harvest, and the invention is made of durable one-piece construction which allows the bags 10 and 110 to be used on ground surface without spilling the soil contained therein.

It will be further obvious to those skilled in the art that many variations may be made in the above embodiments here chosen for the purpose of illustrating the present invention, and full result may be had to the doctrine of equivalents without departing from the scope of the present invention, as defined by the appended claims.

What is claimed is:

1. A growing medium container, comprising:
   (a) a top panel;
   (b) a bottom panel attached to and opposed from said top panel to define an opening therebetween; and
   (c) first closure means attached to said top panel for closing said opening;
   said top panel and said bottom panel being comprised of knitted material.

2. The growing medium container defined in claim 1, said opening comprising an elongate slit.

3. The growing medium container defined in claim 1, said first closure means including heat sensitive glue.

4. The growing medium container defined in claim 1, said first closure means including heat sensitive glue attached to either said top panel or to said bottom panel.

5. The growing medium container defined in claim 1, and second closure means attached to said top panel and said bottom panel for bonding said top panel to said bottom panel.

6. The growing medium container defined in claim 5, said second closure means including stitched fiber.

7. The growing medium container of claim 1, said knitted material being a single sheet of substantially porous polypropylene.

8. A growing medium container, comprising:
a top panel, a bottom panel attached to and opposed from said top panel, said top panel and said bottom panel defining therebetween an opening and including closure means for closing said opening, said top panel and said bottom panel formed of knitted material.

9. The growing medium container of claim 8, said knitted material being a single sheet of substantially porous polypropylene.

10. The growing medium container defined in claim 8, said closure means including heat sensitive glue.

11. A container for holding growing medium for a plant, comprising:
a sheet of material having side edges bonded together to define a pocket for receiving said growing medium, a first flap extending between two of said edges and a second flap overlapping said first flap, said first flap and said second flap defining an opening therebetween for providing access into said pocket for the insertion of a portion of said plant to allow said plant into said pocket.

12. The container of claim 11, said material comprising polypropylene.

13. The container of claim 12, said polypropylene material being knitted.

14. The container of claim 7, said pocket defined by said textile material being wider than deep in dimension.

* * * * *